M. J. WEBER.
WEIGHING SCALE.
APPLICATION FILED JAN. 19, 1917.

1,249,262.

Patented Dec. 4, 1917.
3 SHEETS—SHEET 1.

WITNESSES:
Al. Stark
C. B. Knudsen

INVENTOR:
MATHIAS J. WEBER,
BY Michael Stark & Sons
ATTORNEYS.

M. J. WEBER.
WEIGHING SCALE.
APPLICATION FILED JAN. 19, 1917.

1,249,262.

Patented Dec. 4, 1917.

3 SHEETS—SHEET 2.

WITNESSES:
Al Stark
E. B. Knudsen

INVENTOR:
MATHIAS J. WEBER.
BY Michael J. Stark & Sons
ATTORNEYS.

M. J. WEBER.
WEIGHING SCALE.
APPLICATION FILED JAN. 19, 1917.

1,249,262.

Patented Dec. 4, 1917.
3 SHEETS—SHEET 3.

WITNESSES:
Al Stark.
C B Knudsen.

INVENTOR:
MATHIAS J. WEBER.
BY Michael J Stark & Son
ATTORNEYS.

UNITED STATES PATENT OFFICE.

MATHIAS J. WEBER, OF CHICAGO, ILLINOIS.

WEIGHING-SCALE.

REISSUED

1,249,262.

Specification of Letters Patent. Patented Dec. 4, 1917.

Application filed January 19, 1917. Serial No. 143,247.

*To all whom it may concern:*

Be it known that I, MATHIAS J. WEBER, a citizen of the United States, and a resident of the city of Chicago, in the county of Cook and State of Illinois, have invented a certain new and useful Improvement in Weighing-Scales; and I do hereby declare that the following description of my said invention, taken in connection with the accompanying sheets of drawing, forms a full, clear, and exact specification, which will enable others skilled in the art to which it appertains to make and use the same.

My invention relates generally to improvements in weighing scales, and it consists, essentially, in the novel and peculiar combination of parts and details of construction, as hereinafter first fully set forth and described and then pointed out in the claims.

The object of my present invention is the production of an efficient and serviceable weighing scales which, although well adapted for general use as a counter scales, is more especially designed for automatically taking the weight of humans; and for this purpose, the scales is to be preferably placed onto a floor so that a person, desiring to ascertain his weight, can readily step upon the scale platform and by looking down onto a rotatable, indexed dial, can see how much he weighs. And for the purpose of making these scales very compact and readily portable, the scale mechanism is of the spring-type construction which lends itself best to the purposes for which my invention is designed.

Figure 1:
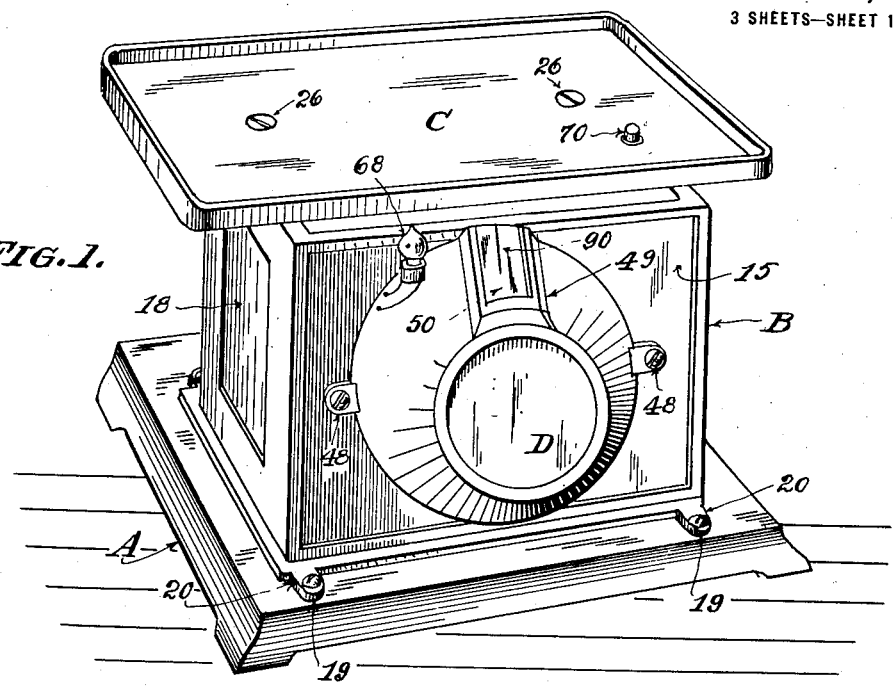
Figure 2:
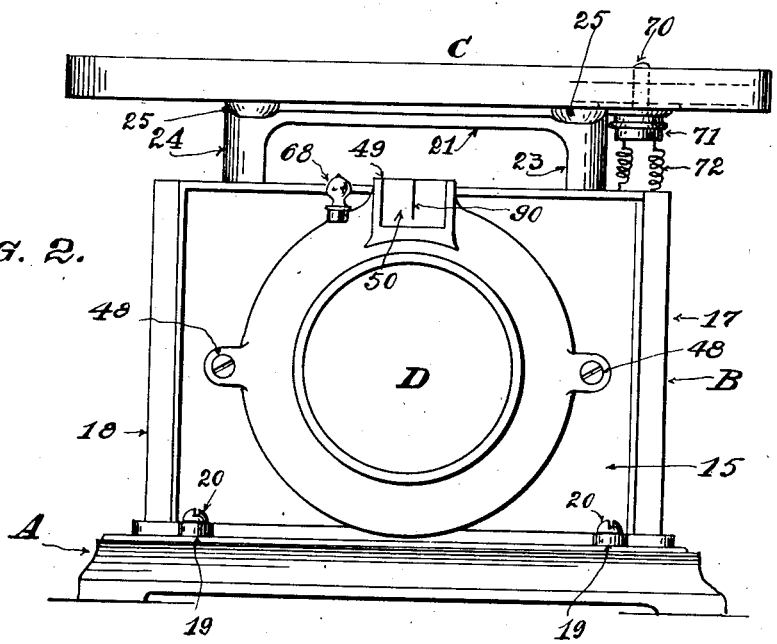
Figure 3:
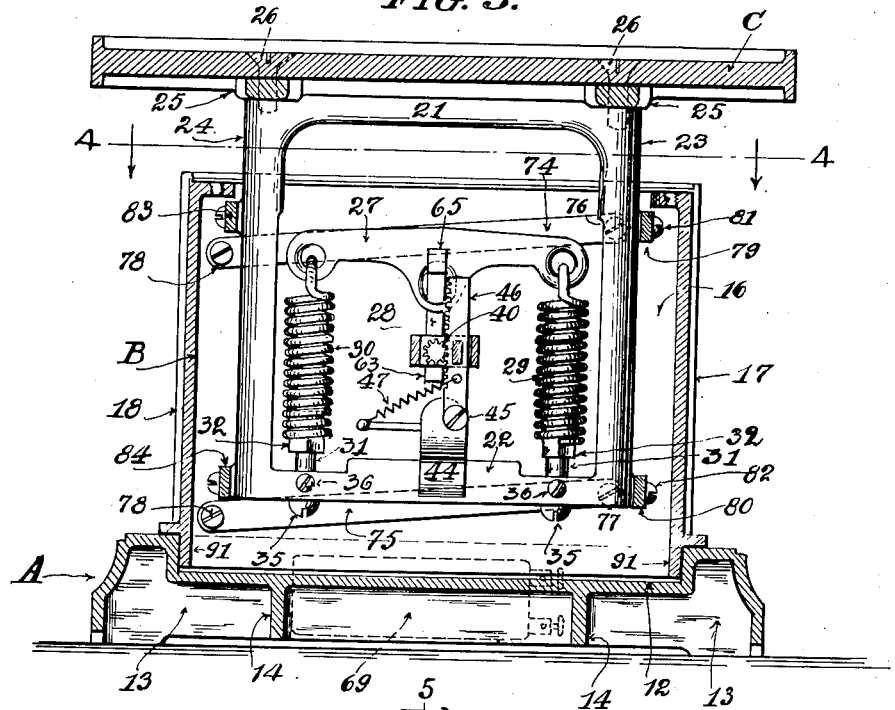
Figure 4:
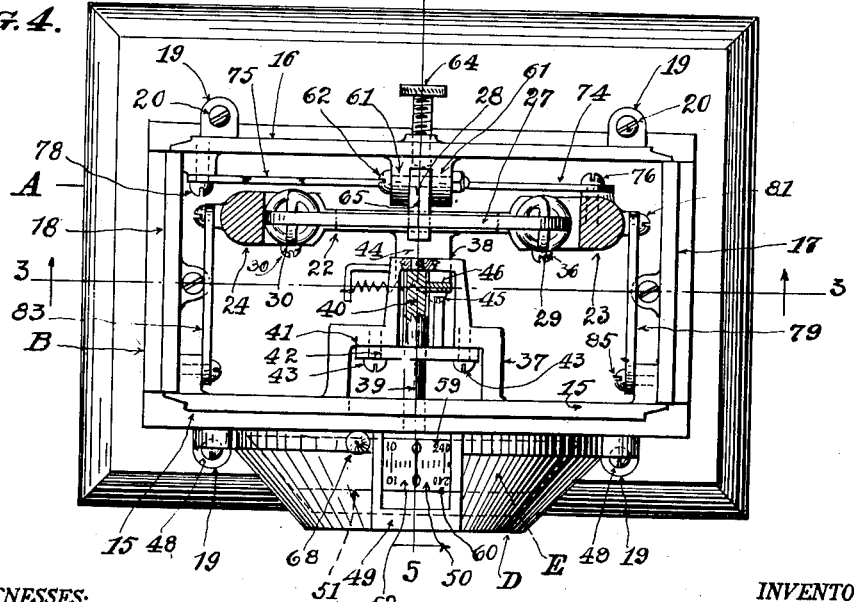
Figure 5:
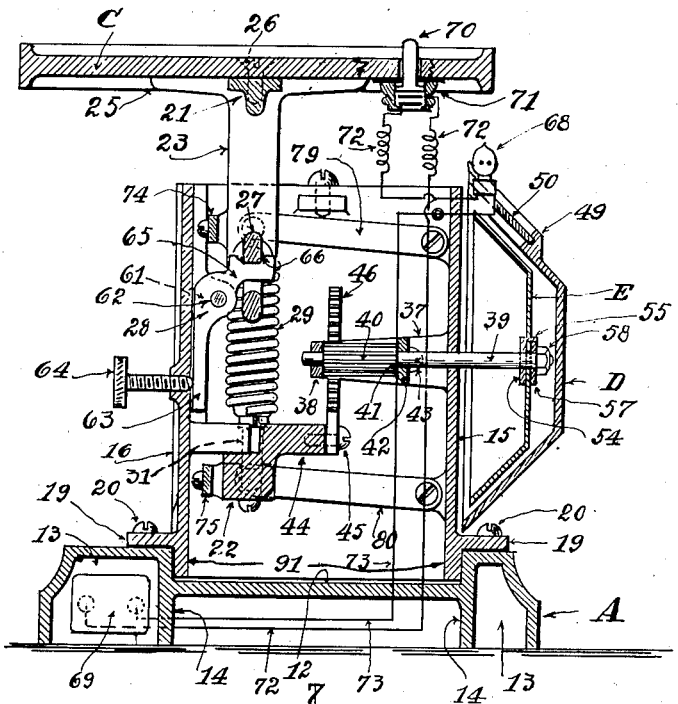
Figure 8:
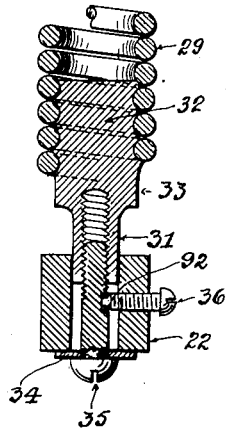
Figure 6:
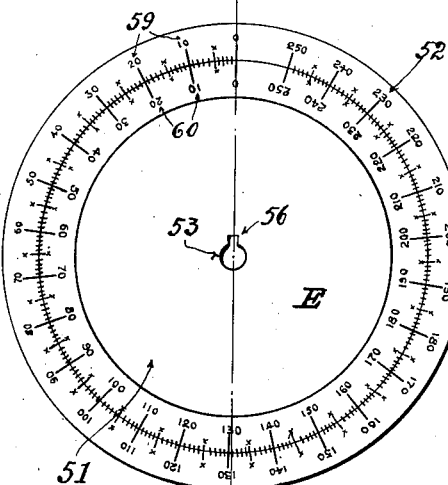
Figure 7:
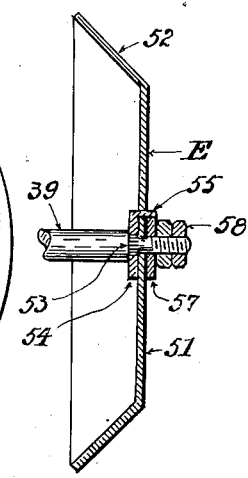

In the drawings, which disclose the preferred embodiment of my invention, and which form a part of this specification, Figure 1 is a perspective view of my improved scales. Fig. 2 is a front elevation of the same. Fig. 3 is a longitudinal vertical section on line 3—3 of Fig. 4. Fig. 4 is a plan view below the line 4—4 of Fig. 3. Fig. 5 is a transverse sectional view on line 5—5 of Fig. 4. Fig. 6 is a front elevation of the rotatable dial detached, and Fig. 7 is a vertical section of the same on line 7—7 of Fig. 6. Fig. 8 is a detail sectional view of a fragment of one of the springs used in this apparatus, and showing the means for tensioning this spring.

In these drawings, A designates the base of the scales. This base is a substantially rectangular shell having in its top surface a depression 12, and in its body several compartments 13, formed by longitudinal and transverse ribs or bars 14, which ribs serve also as strengthening bars to the structure A. Upon this base there is mounted a casing or housing B, comprising two side, and two end walls 15, 16, 17, and 18, respectively, said walls having laterally extending lugs 19, receiving screws 20, by which the casing is securely fastened to the base A.

C is the platform upon which the goods, or the person to be weighed are placed. This platform is rectangular in contour, and it is supported upon a substantially rectangular, preferably integrally formed frame, comprising a top member 21, a bottom member 22, right side-bar 23, and left side-bar 24. This top member 21 has laterally extending lugs or flanges 25, the platform being secured to said top member by screws 26. Below this top member 21 there is located in the casing a beam 27, which beam is medially suspended from a bell crank lever 28, to be hereinafter more fully set forth. The two extremities of the beam 27 are punctured, and in these openings there are secured tensioned springs 29, 30, with one of their ends, the other ends of said springs being hitched to the bottom member 22 of the rectangular frame in a peculiar manner, as follows:

Within the lower portion of each spring there is secured a bolt 31, shown in detail in Fig. 8, which bolt has a comparatively long head 32, which head is externally screw-threaded to engage the interior convolutions of said spring. Below this head there is a polygonal wrench section 33, and the shank of this bolt, which enters a bore 34, in the lower member 22 of the rectangular frame, is internally screw-threaded to be engaged by an adjusting screw 35; while a set screw 36, acting on said screw when applied, prevents said bolt from rotating, which would disturb the tension of said spring. This peculiar method of attaching the lower ends of the springs 29, 30, to the bottom member, affords means for properly adjusting the tension of said springs, so as to indicate weight correctly; it being understood that these springs are made of a suitable grade of tempered steel of a fixed external diameter and proper thickness, and having a suitable number of turns or convolutions, so as to sustain a maximum load with a fixed limit of expansion, a matter which, by repeated trials, can be readily accomplished.

Extending into the casing there projects from the front wall 15 thereof a bracket 37, the inner end 28 of which has a bearing in which there is rotatably mounted a shaft 39, having a pinion 40, there being in said bracket 37 an offset portion 41, in which a bearing plate 42, is secured by screws 43, said bearing plate supporting said pinion shaft near the front wall of the casing C.

From the forward face of the lower, or bottom member 22 extends forwardly, a bracket 44 and to this bracket there is pivoted, by a pivot bolt 45, a toothed rack 46, which engages with the pinion 40; a spring 47, being provided to keep the rack and pinions in proper mesh.

To the outer face of the front plate 15 of the casing, there is secured, preferably by bolts 48, a cap D, dish-shaped in contour, there being at the apex of said cap a window frame 49, in which there is a transparent plate 50. Within this cap D there is located a rotatable dial E, shown in detail in Figs. 6 and 7. This dial is a dish-shaped structure of preferably thin sheet metal so as to be very light; and from its bottom 51 extends a rim 52, at an angle of approximately 45 degrees, to the plane of the bottom. This bottom is centrally punctured at 53, Fig. 6, and the outer end of the pinion shaft 39 is reduced in diameter, and over this reduced portion the dial is placed, bottom side out, as shown in Fig. 5.

Scales of the nature described are rather roughly used: articles to be weighed being usually placed onto the platform rather carelessly, and often thrown thereon, which causes the dial to rotate rather suddenly and rapidly, so that the inertia of the dial, resisting rotation, may cause the dial to become loose on the pinion shaft. To avoid this objection, I exteriorly roughen or groove the reduced portion of the shaft 39 adjacent to the shoulder thereon, and onto this roughened portion 53 I force a washer 54, having a projecting nose or dog 55, passing through the elongated portion or slot 56, Fig. 6, in the bottom of the dial; a second washer 57, and lock-nuts 58, on the outer surface of the bottom 51 being provided to securely lock the dial to the pinion shaft.

The dial E is graduated on the outer peripheral surface of the rim 52, into preferably 250 divisions, the maximum capacity of the present scales being 250 lbs., and the indices are so placed that one series thereof, 59, is located near the marginal edge of the rim, so that it will read right when viewed from the front of the scales, while the second series of indices 60, is located near the jointure of the rim to the bottom, and this series of indices reads right to a party standing on the platform C and looking down on the dial, a hair-line 90, drawn on the transparent plate 50 serving as an index-pointer. By thus constructing the dial the reading thereof can be ascertained by a person standing on the platform, and by another person or persons standing in front of the scales, all at the same time.

I have heretofore referred to the bell crank lever 28, and shall now proceed to describe its construction and its function.

From the back plate 16 of the casing projects two lugs or ears 61, wherein the bell crank lever is pivoted upon a bolt 62. The long arm of this bell crank lever extends downwardly, and it is acted upon by an adjusting screw 64. The other, shorter arm 65, of said bell crank lever is offset and notched near its terminal, and in this notch, 66, the beam 27 is suspended.

The object of the adjusting screw 64 acting on the long arm of the bell crank lever is to raise or lower the beam, and with it and the springs 29, 30, move the rectangular frame and the rack and pinion, and the dial accordingly so that by manipulating this adjusting screw 64, the dial can be brought to the zero mark when there is no weight on the platform, which is necessary when assembling the scale mechanism, and may also become necessary after the scales have been in use for some time. Since moving the beam 27 as described moves with it the entire rectangular frame and the platform, this movement does not affect the tension of the springs, nor the accuracy of the scales.

When the scales are placed upon a floor, it is more or less difficult for a person standing on the platform to read the index on the dial owing to the fact that there is frequently not sufficient light to see the index. To overcome this objection, I provide means for lighting the dial, such means including a small electric incandescent lamp 68, placed at the side of the window frame 49, a battery 69, located in one of the compartments 13 in the base A, a push button 70 projecting from the upper surface of the platform, a switch 71, located underneath the platform, electric conducting wires 72, leading from the battery to the switch and thence to the lamp, and a return wire 73, leading back to the battery. By these means a person stepping onto the platform will step onto the push button 70, thereby closing the electric circuit and cause the incandescent lamp to glow so that he can plainly read the index on the dial. When stepping off the platform, the electric circuit is opened and the lamp extinguished.

In order to properly guide the rectangular frame with its superposed platform in their vertical movement, and with the least possible frictional resistance, I resort to the following mechanism:

Connected to the side member 23 of the rectangular frame are two links, 74, 75, the former link being pivoted to said side member at one end by a pivot bolt 76, and the latter link being pivoted to said side member at the lower end thereof by a pivot bolt 77. The other ends of said links are pivoted to the back wall of the casing by pivot bolts 78. These two links form, as it were, a parallelogram, and as such guide said rectangular frame in one direction.

Connected to side member 23 at right angles to the links 74, 75, are two transverse links 79, 80, the link 79 being pivoted at one end to the member 23 by a bolt 81, while the link 80 is pivoted at one end to said member 23 by a pivot bolt 82, the other ends of said links being pivoted to the end member 17 of the casing B, by pivot bolts 85. To the side member 24 of the rectangular frame there are pivoted links 83, 84, the arrangement of the pivotal connections being the same as that of the links 80, 81, so that the two pairs of links 79, 80, and 83, 84, guide said rectangular frame in the other direction.

It is obvious that by thus guiding the rectangular frame and the platform attached thereto, I have reduced friction to a minimum, so much so as not to affect the accuracy of the scales to an appreciable extent.

I have heretofore stated that the base A has in its top surface a depression 12. This depression serves to receive extensions 91 on the front, rear, and side walls of the casing B, whereby said casing is strongly supported on said base and prevented from lateral movement thereon, a construction which adds materially to the rigidity of the entire structure.

I have also stated that the shank of the adjusting bolt for tensioning the spring enters the bore 34 in the bottom member of the rectangular frame, and that a set screw 36 acts on said adjusting screw 35 to prevent rotation thereof. This adjusting screw 35 has a notch 92, in its periphery into which the point of the set screw 36 enters to lock the adjusting screw in adjusted position. This tensioning device is also used on the spring 30 without change or modification.

I have, furthermore, shown the incandescent electric lamp 68 placed at the side of the window frame 49; but it is obvious that this lamp may be placed directly over said window frame, as illustrated in Fig. 5, or in any other convenient position.

I have heretofore described with considerable minuteness the preferred embodiment of my invention, but I desire it to be understood that many of the details of construction may be varied, and parts omitted without departing from the scope of my invention as defined in the subjoined claims.

Having thus fully described this invention, I claim as new, and desire to secure to myself by Letters Patent of the United States—

1. In weighing scales of the nature described, the combination, of a casing, a rectangular frame in said casing, said rectangular frame having top, bottom, and side members, said rectangular frame being pivotally mounted in said casing, a platform mounted on said rectangular frame, a beam suspended in said rectangular frame below said top member, springs hitched to the extremities of said beam at one of their ends and to the bottom member aforesaid at their other ends, a rack pivotally secured to said bottom member, a shaft in said casing, said shaft having a pinion engaging said rack, and a dial mounted on the outer end of said shaft, said dial comprising a plane circular bottom and a flaring rim thereon, there being on the outer surface of said rim two series of indicia indicating weight.

2. In weighing scales of the nature described, the combination, of a casing, a rectangular frame in said casing, a beam in said casing, springs connected to said beam and to said rectangular frame, a rack bar connected to said frame, said rack bar moving in a vertical plane, a shaft rotatably mounted in said casing, said shaft being in horizontally disposed position, a pinion on said shaft meshing with said rack bar, a dial at the outer end of said shaft, said dial being constructed to rotate in a vertical plane, a bell crank lever pivotally mounted in said casing, said beam being medially suspended from one arm of said bell crank lever, and an adjusting screw constructed to act on the other arm of said bell crank lever to move said frame in vertical direction, said adjusting screw passing through, and projecting from, the rear wall of said casing.

3. In weighing scales of the nature described, the combination, of a housing, a rectangular frame pivotally mounted in said housing, a beam pivotally suspended in said housing, springs connected to said beam and said rectangular frame, and means for regulating the tension of said springs, comprising a bolt having a tubular, internally screw-threaded shank engaging a member of said rectangular frame, a head on said shank said head being externally screw-threaded to engage the internal convolutions of said spring, a set screw acting on said shank to prevent rotation of said bolt but permitting vertical movement thereof, and an adjusting screw engaging said tubular, screw-threaded shank.

4. In weighing scales of the nature described, the combination, of a base, a casing mounted on said base, a platform above said casing, spring-actuated mechanism located in said casing, a rotatable dial in front of said casing and connected to said spring-actuated mechanism, said dial comprising an annular disk, an annular rim on said disk, said rim having a conical surface, said surface being at an angle of approximately 45 degrees to the plane of the disk, indices on the outer surface of said rim, said indices including two series of numerals, one series being readable correctly from one position, the other series being correctly readable from a different position.

5. In weighing scales of the nature described, the combination, of a casing, weighing mechanism mounted in said casing, and a rotating dial connected to said weighing mechanism, said dial comprising an annular disk, an annular rim on said disk, said rim having a conical surface, said surface being at an angle of approximately 45 degrees to the plane of said disk, there being on the outer surface of said rim two concentric circles of numerals, one of these circles of numerals being correctly readable from one position, the other of said circles of numerals being correctly readable from a different position.

6. In weighing scales of the nature described, the combination, of a base, a casing mounted on said base, weighing mechanism in said casing, a platform above said casing and connected to said weighing mechanism, a rotating dial in front of said casing, said dial being connected to said weighing mechanism, a switch on said platform, said switch having a push-button protruding from said platform, an electric battery in said base, an incandescent electric lamp in front of said dial, an open, electrical circuit connecting said battery to said switch and said lamp, said circuit being closed when a person steps onto said push button, and again opened when said person steps off the platform.

7. A platform scales having automatically operating mechanism for lighting and extinguishing an electric lamp when an article is placed on the platform of said scales, and removed therefrom, said mechanism including an element projecting above the said platform, which element when depressed by an article placed on said platform will close an electric circuit to light said lamp.

8. In weighing scales, weighing mechanism including a platform, an electric incandescent lamp connected to said scales, and automatically operating means connected to said platform for lighting said lamp when an article is placed onto said platform, and extinguishing the same when said article is removed from said platform, said electrically operating mechanism including a switch secured to said platform, said switch having an element above said platform constructed to be depressed to close an electric circuit to light said lamp when an article is placed on said platform onto said element, and to open said electric circuit when said article is removed from said platform, to extinguish said lamp.

In testimony that I claim the foregoing as my invention, I have hereunto set my hand.

MATHIAS J. WEBER.